（12) United States Patent
Virmani

(10) Patent No.: US 10,063,520 B2
(45) Date of Patent: Aug. 28, 2018

(54) SMART STORAGE WITH VPN AND DISCOVERY

(71) Applicant: SEAGATE TECHNOLOGY LLC, Cupertino, CA (US)

(72) Inventor: Ashish Virmani, Haryana (IN)

(73) Assignee: SEAGATE TECHNOLOGY LLC, Cupertino, CA (US)

( * ) Notice: Subject to any disclaimer, the term of this patent is extended or adjusted under 35 U.S.C. 154(b) by 16 days.

(21) Appl. No.: 14/938,572

(22) Filed: Nov. 11, 2015

(65) Prior Publication Data

US 2017/0134343 A1    May 11, 2017

(51) Int. Cl.
*H04L 29/06*    (2006.01)
*H04L 29/08*    (2006.01)

(52) U.S. Cl.
CPC .......... *H04L 63/0272* (2013.01); *H04L 63/08* (2013.01); *H04L 67/141* (2013.01)

(58) Field of Classification Search
CPC . H04L 12/4675; H04L 63/04; H04L 63/0272; H04L 63/029; H04L 67/42; H04L 29/06612
See application file for complete search history.

(56) References Cited

U.S. PATENT DOCUMENTS

| 8,369,254 | B2* | 2/2013 | Sood | H04L 12/66 370/311 |
| 8,745,371 | B2 | 6/2014 | Obligacion | |
| 8,869,270 | B2* | 10/2014 | Touboul | G06F 21/57 726/1 |
| 8,892,689 | B1 | 11/2014 | Mowry | |
| 9,241,044 | B2* | 1/2016 | Shribman | H04L 67/32 |
| 2009/0268903 | A1 | 10/2009 | Bojinov et al. | |
| 2016/0180092 | A1* | 6/2016 | Aktas | G06F 21/562 726/23 |

* cited by examiner

*Primary Examiner* — Hadi S Armouche
*Assistant Examiner* — Paul E Callahan
(74) *Attorney, Agent, or Firm* — Holland & Hart LLP

(57) ABSTRACT

Systems and methods for independently secured storage are described. In one embodiment, a storage device includes a network adapter to discover a remote storage device and a virtual private network (VPN) client to establish a secure connection between the storage device and the remote storage device. In some cases, the secure connection includes a point-to-point connection between the storage device and the remote storage device.

20 Claims, 6 Drawing Sheets

SMART STORAGE WITH VPN AND DISCOVERY

SUMMARY

The disclosure herein includes methods and systems for independently secured storage. In some embodiments, the present systems and methods may provide intelligent storage devices configured to independently establish secure connections with other local and/or remote devices such as a virtual private network (VPN) between two storage devices and to provide auto-discovery of the storage device to local and/or remote devices.

A storage device for independently secured storage is described. In one embodiment, the storage device may include a network adapter to discover a remote storage device and a virtual private network (VPN) client to establish a secure connection between the storage device and the remote storage device. In some cases, the secure connection may include a point-to-point connection between the storage device and the remote storage device.

In some embodiments, the network adapter may be configured to advertise a presence of the storage device to at least one of a second remote storage device and a remote computing device. In some embodiments, the network adapter may be configured to receive a connection request from a remote computing device and request credentials from the remote computing device in response to the connection request.

In some embodiments, the network adapter may be configured to receive the requested credentials. In one embodiment, a processor of the storage device may be configured to perform an authentication of the remote computing device based at least in part on the provided credentials. Upon authenticating the remote computing device, the VPN client may be configured to establish a secure connection with the remote computing device.

In some embodiments, the secure connection between the storage device and the remote computing device may include a VPN connection. In some configurations, the secure connection with the remote computing device may include a point-to-point connection between the storage device and the second remote storage device. In some embodiments, the storage device may include at least one of a storage server, a storage enclosure containing a plurality of storage drives, and a just a bunch of drives (JBOD) storage device. In some cases, the network adapter includes a transmission control protocol/internet protocol (TCP/IP) stack.

An apparatus for independently secured storage is also described. In one embodiment, the apparatus may include a plurality of storage drives configured for incorporation into a data center or cloud environment, a network adapter to discover a remote storage device, and a virtual private network (VPN) client to establish a secure connection between the apparatus and the remote storage device. In some embodiments, the secure connection may include a point-to-point connection between the apparatus and the remote storage device.

A method for independently secured storage is also described. In one embodiment, the method may include receiving the requested credentials, performing an authentication of the remote computing device based at least in part on the provided credentials, and upon authenticating the remote computing device, establishing a secure connection with the remote computing device. In some cases, the secure connection with the remote computing device may be a point-to-point connection between the storage device and the second remote storage device.

The foregoing has outlined rather broadly the features and technical advantages of examples according to this disclosure so that the following detailed description may be better understood. Additional features and advantages will be described below. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein—including their organization and method of operation—together with associated advantages will be better understood from the following description when considered in connection with the accompanying figures. Each of the figures is provided for the purpose of illustration and description only, and not as a definition of the limits of the claims.

BRIEF DESCRIPTION OF THE DRAWINGS

A further understanding of the nature and advantages of the present disclosure may be realized by reference to the following drawings. In the appended figures, similar components or features may have the same reference label. Further, various components of the same type may be distinguished by following a first reference label with a dash and a second label that may distinguish among the similar components. However, features discussed for various components—including those having a dash and a second reference label—apply to other similar components. If only the first reference label is used in the specification, the description is applicable to any one of the similar components having the same first reference label irrespective of the second reference label.

DETAILED DESCRIPTION

Figure 1:
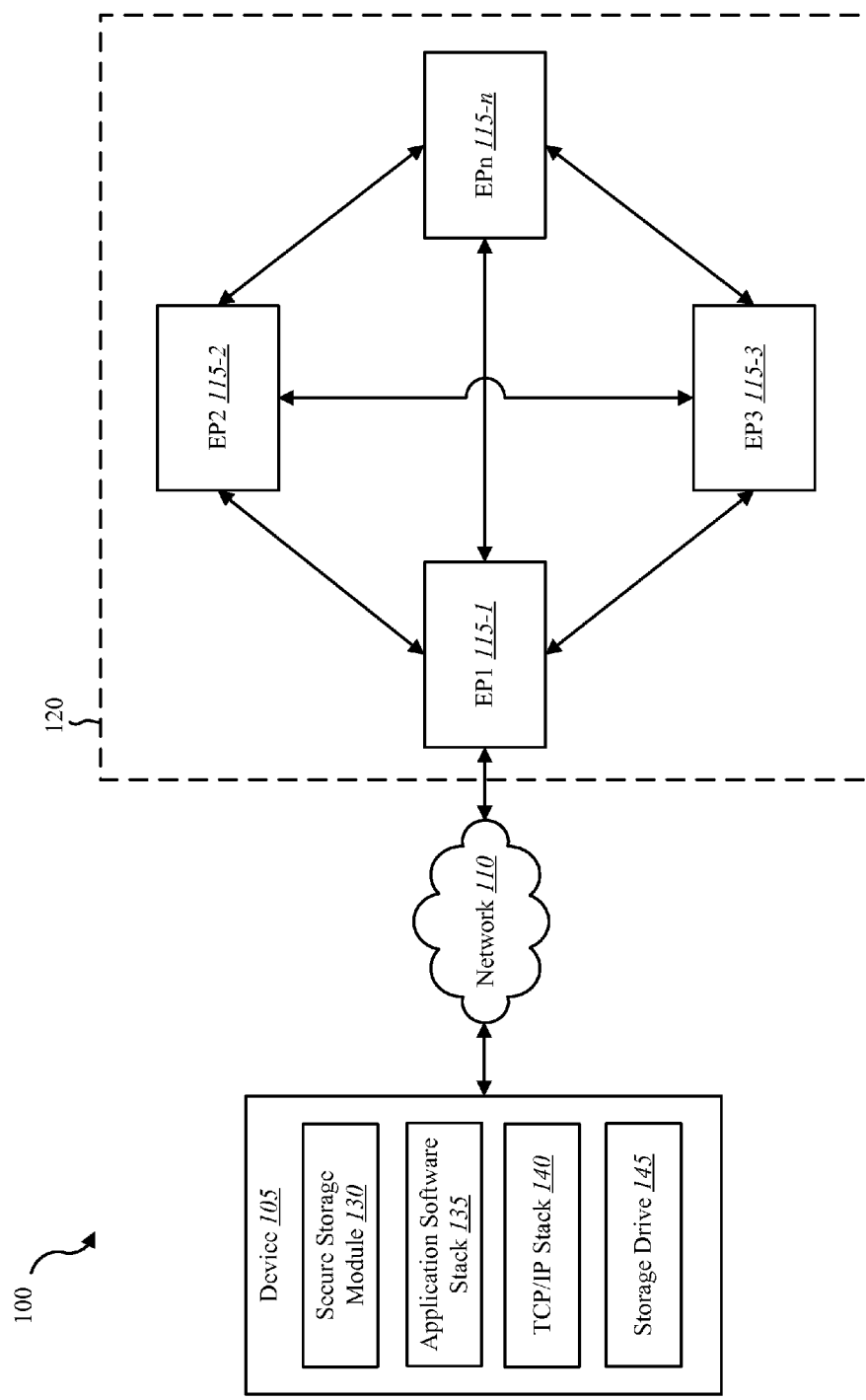
FIG. 1 is a block diagram of an example of a system in accordance with various embodiments of this disclosure.

The following relates generally to independently secured storage. In one embodiment, independently secured storage may include systems and methods for autonomously establishing secure connections between storage devices. Currently, a storage server may provide one or more services to multiple clients. A client may establish a secure connection with the storage server via an authentication process. The authentication process may include a client initializing an application (e.g., an installed software application, a web browser, a web application, etc.) and providing credentials to the application. The application may then send the credentials to a security server, which authenticates the client. Upon authenticating the client the security server may connect the client to a storage server via a secure connection between the security server and the storage server.

As one example, a conventional storage system may provide a storage service such as cloud storage service or a distributed storage system via multiple storage devices located at multiple remote locations. For example, one or more storage enclosures, each filled with multiple drives, may be located at a first location and one or more additional storage enclosures, each filled with multiple drives, may be located at a second location remote to the first location. Accordingly, one or more security servers may be configured to control and secure access to the data held on the multiple drives. For instance, the storage enclosures may be part of a back-end network. Thus, the physical storage media may be located on the back-end network. Access to the back-end network may be provided by a front-end network. The front-end network may include a firewall to control access to the back-end network. Additionally, the authentication/validation may be performed by the front-end network to protect access to data on the back-end network. As an example, a first storage device may be located at a first location, a second storage device at a second location remote to the first location, a security server at a third location remote to the first and second locations, and a user's computing device at a fourth location remote to the first, second, and third locations. In order for the user to access the data on first and/or second storage devices, the user's computing device first accesses the security server at the third location via an internet protocol (IP) connection over the Internet. Upon being validated and/or authenticated by the security server (e.g., password validation, credential authentication, etc.), the user's computing device may be granted secure access to the data on the first and/or second storage devices located at the first and second locations, respectively. For example, the security server may establish a secure connection. The security server may establish the secure connection between the user's computing device and the security server. The security server may already have secure connections established with the first and/or second storage devices. Thus, the security server may establish a first secure connection between the security server and a storage server and a second secure connection between the security server and the user's computing device. Thus, the security server may route secure data between the first and second secure connections between the user's computing device and the first and/or second storage devices to enable the user's computing device to access the first and/or second storage devices.

In such examples of conventional storage systems, at least two separate secure connections must be established to connect a user's computer to a storage device. Each additional connection is an additional security risk. Moreover, each additional connection imposes additional latency on the overall connection. Furthermore, the security server must be maintained and operated essentially every day of every week, all year long. Security servers impose significant costs due to the cost of operating the security servers as well as the cost of maintaining the environment in which the servers operate (e.g., physical security, temperature control, humidity control, etc.). In some cases, the conventional storage system may employ two or more security servers, which further increases the costs. Thus, the conventional storage system employs multiple devices that impose additional security risks and additional latency, as well as additional operational costs.

Accordingly, the current systems and methods describe a storage system that integrates network security into the storage devices, thereby minimizing both the security risks and latency, as well as removing the costs associated with each security server. With the current systems and methods, a user's computing device may establish a direct 1-to-1 connection with a storage device. Moreover, a storage device implementing the current systems and methods may be automatically discoverable, seamlessly adding itself to a distributed data system and automatically establishing connections without manual intervention. The storage device may be automatically and autonomously discoverable by simply powering on the device, automatically and autonomously establishing secure connections with other storage devices in the distributed data system, and automatically and autonomously establishing secure connections with client computing devices. Thus, the present systems and methods may provide improved elasticity, improved ease of customer deployment, ease of configuration, ease of maintenance, improved up-time, and so forth.

FIG. 1 is a block diagram illustrating one embodiment of an environment 100 in which the present systems and methods may be implemented. The environment may include device 105, a network 110, and one or more endpoint devices 115 (e.g., EP1 115-1, EP2, 115-2, EP3 115-3, and so on up to EPn 115-$n$ for some value "n"). In some cases, the endpoint devices 115 may be part of a distributed data system 120.

Examples of device 105 include a storage server, a storage enclosure, a storage controller, storage drives in a distributed storage system, storage drives on a cloud storage system, storage devices on personal computing devices, storage devices on a server, etc. In some configurations, device 105 may include a secure storage module 130, an application software stack 135, a transmission control protocol/internet protocol (TCP/IP) stack 140, and a storage drive 145. In some embodiments, device 105 may be a component of storage drive. Alternatively, device 105 may be a component of a host (e.g., operating system, host hardware system, etc.) of a storage device.

In one embodiment, device 105 may be a computing device with one or more processors, memory, and/or one or more storage devices. In some cases, device 105 may include a wireless storage device. In some embodiments, device 105 may include a cloud drive for a home or office setting. In one embodiment, device 105 may include a network device such as a switch, router, access point, etc. In one example, device 105 may be operable to receive data streams, store and/or process data, and/or transmit data from, to, or in conjunction with one or more local and/or remote computing devices. In some cases, device 105 may include a database. In some cases, the database may include one or more databases internal and/or external to device 105. Additionally, or alternatively, the database may include a connection to a wired and/or a wireless database. Additionally, as described in further detail herein, software and/or firmware (e.g., stored in memory) may be executed on a processor of device 105. Such software and/or firmware executed on the processor may be operable to cause the device 105 to monitor, process, summarize, present, and/or send a signal associated with the operations described herein.

In one embodiment, the secure storage module 130 may enable device 105 to autonomously discover remote storage devices and establish secure connections with the remote storage devices. In some embodiments, the application software stack 135 may include an operating system, an installed application, a web application, a web server, a database, and a programming language, middleware, installable files, software definitions, software patches, etc. In some embodiments, the application software stack 135 may include a group of programs that work in tandem to produce a result or achieve the systems and methods described herein. In some configurations, the application software stack 135 may include any set of applications and/or any group of utilities that work in a custom and defined order to generate and perform the system and methods described herein.

In some embodiments, TCP/IP stack 140 may operate using a computer networking model and may include a set of communications protocols used to establish connections over the Internet and other similar computer networks. In some cases, the device 105 may include an Ethernet chipset that operate in conjunction with the TCP/IP stack 135. Examples of storage drive 145 may include one or more hard disk drives, solid state drives, hybrid drives, etc.

Examples of endpoint devices 115 may include storage devices such as a storage server, a storage enclosure, a distributed data storage node, a computing device such as a data server, and the like. In one embodiment, device 105 may be an example of an endpoint device 115. Examples of distributed data system 120 may include a cloud storage environment, an electronic commerce system, distributed data centers, and the like. One or more of the endpoint devices 115 may be located in different geographical locations. For example, EP1 115-1 may be located in Asia, EP2 115-2 in Europe, EP3 115 in North America, and so forth. As one example, data centers of an e-commerce entity may be distributed across several geographical locations. Each data center (e.g., endpoint devices 115) may include storage and networking. Each data center may be connected to each other. Supposing a customer sitting in India places an order online, the order may be received at the nearest/lowest-latency data center so as to provide the fastest response time. The data related to the order may be replicated across the data centers (e.g., data in EP1 115-1 may be replicated to EP2 115-2 and so forth), thus providing faster response time for customers in different geographical locations. The endpoint devices 115 may include one or more storage devices such as storage servers, storage enclosures, computing devices, etc. Endpoint devices 115 may include any combination of hard disk drives, solid state drives, and hybrid drives that include both hard disk and solid state drives.

In some embodiments, device 105 may connect to one or more endpoint devices 115 via one or more networks such as network 110. Examples of networks include cloud networks, local area networks (LAN), wide area networks (WAN), virtual private networks (VPN), a personal area network, near-field communication (NFC), a telecommunications network, wireless networks (using 802.11, for example), and/or cellular networks (using 3G and/or LTE, for example), etc. In some configurations, the network may include the Internet and/or an intranet. The device 105 may receive and/or send signals over a network via a wireless communication link. In some embodiments, a user may access the functions of device 105 via a local computing device, remote computing device, and/or network device. For example, in some embodiments, device 105 may include an application that interfaces with a user (e.g., application software stack 135). In some cases, device 105 may include an application that interfaces with one or more functions of a network device, remote computing device, and/or local computing device. In some embodiments, the systems and methods described herein may be performed on a single device (e.g., device 105). In some cases, the methods described herein may be performed on multiple storage devices or a network of storage devices (e.g., device 105, and endpoints 115, etc.).

Figure 2:
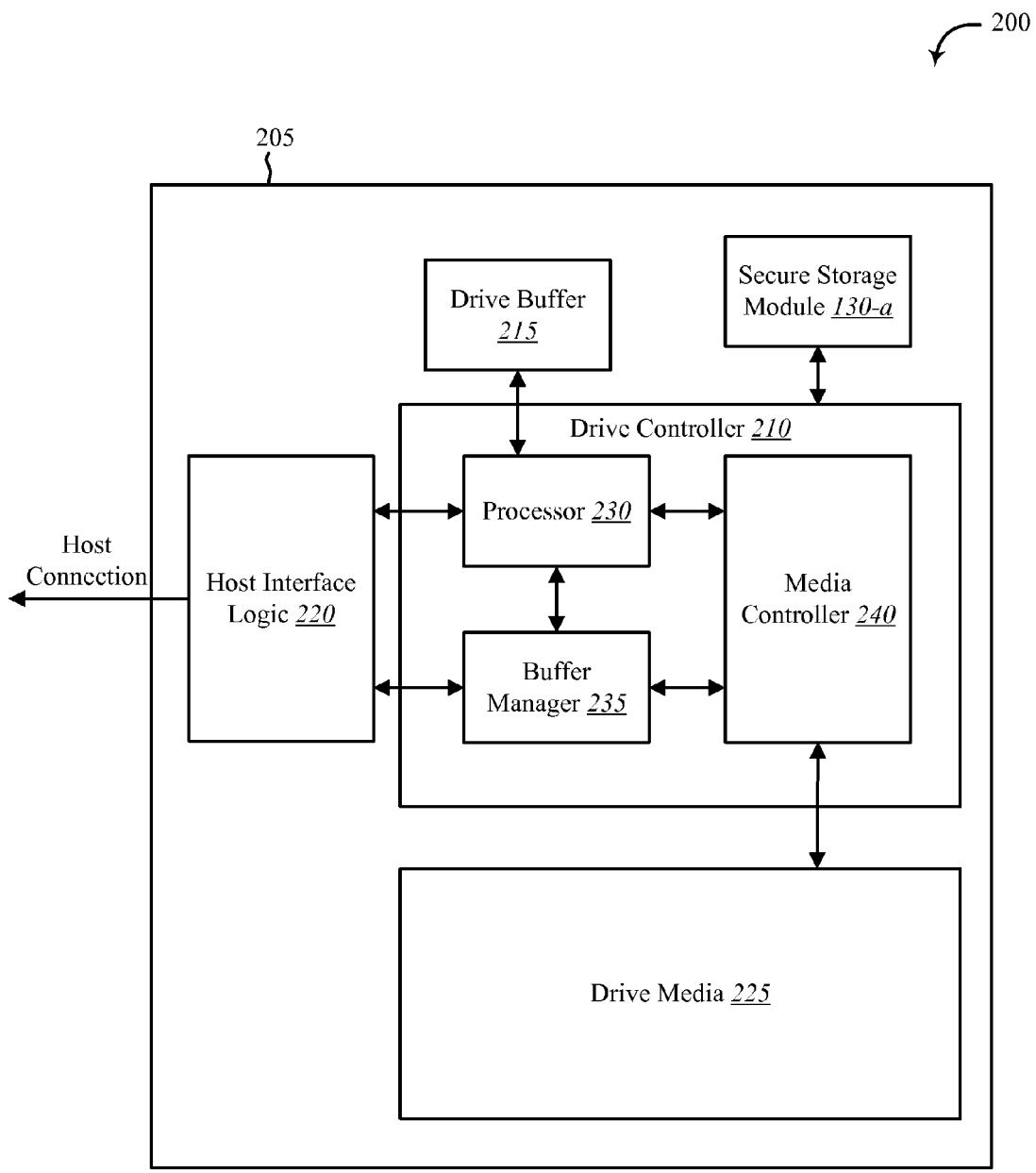
FIG. 2 shows a block diagram of a device in accordance with various aspects of this disclosure.

FIG. 2 shows a block diagram 200 of an apparatus 205 for use in electronic communication, in accordance with various aspects of this disclosure. The apparatus 205 may be an example of one or more aspects of device 105 described with reference to FIG. 1. The apparatus 205 may include a drive controller 210, drive buffer 215, host interface logic 220, drive media 225, and secure storage module 130-a. Each of these components may be in communication with each other and/or other components directly and/or indirectly.

One or more of the components of the apparatus 205, individually or collectively, may be implemented using one or more application-specific integrated circuits (ASICs) adapted to perform some or all of the applicable functions in hardware. Alternatively, the functions may be performed by one or more other processing units (or cores), on one or more integrated circuits. In other examples, other types of integrated circuits may be used (e.g., Structured/Platform ASICs, Field Programmable Gate Arrays (FPGAs), and other Semi-Custom ICs), which may be programmed in any manner known in the art. The functions of each module may also be implemented—in whole or in part—with instructions embodied in memory formatted to be executed by one or more general and/or application-specific processors.

In one embodiment, the drive controller 210 may include a processor 230, a buffer manager 235, and a media controller 240. The drive controller 210 may process, via processor 230, read and write requests in conjunction with the host interface logic 220, the interface between the apparatus 205 and the host of apparatus 205 (e.g., an operating system, host hardware system, etc.). The drive buffer 215 may hold data temporarily for internal operations of apparatus 205. For example, a host may send data to apparatus 205 with a request to store the data on the drive media 225. The driver controller 210 may process the request and store the received data in the drive media 225. In some cases, a portion of data stored in the drive media 225 may be copied to the drive buffer 215 and the processor 230 may process or modify this copy of data and/or perform an operation in relation to this copy of data held temporarily in the drive buffer 215.

In some embodiments, host interface logic 220 may connect to a host of apparatus 205. Examples of hosts may include a storage enclosure, a storage server, a computing device, etc. In some cases, the host interface logic 220 may use one or more IP communication protocols to communicate with a host and/or one or more remote computing devices.

Although depicted outside of drive controller 210, in some embodiments, secure storage module 130-a may include software, firmware, and/or hardware located within and/or outside of drive controller 210. For example, secure storage module 130-a may include at least a portion of processor 230, buffer manager 235, media controller 240, drive buffer 215, host interface logic 220, drive media 225, and/or one or more other elements of apparatus 205. In one example, secure storage module 130-a may include one or more instructions executed by processor 230, buffer manager 235, and/or media controller 240. The secure storage module 130-a may be configured to detect remote storage devices and autonomously establish secure, point-to-point connections between apparatus 245 and a detected remote storage device. For example, apparatus 205 may include a local storage server and secure storage module 130-a may establish a VPN connection directly between the local storage server and a remote storage server.

Figure 3:
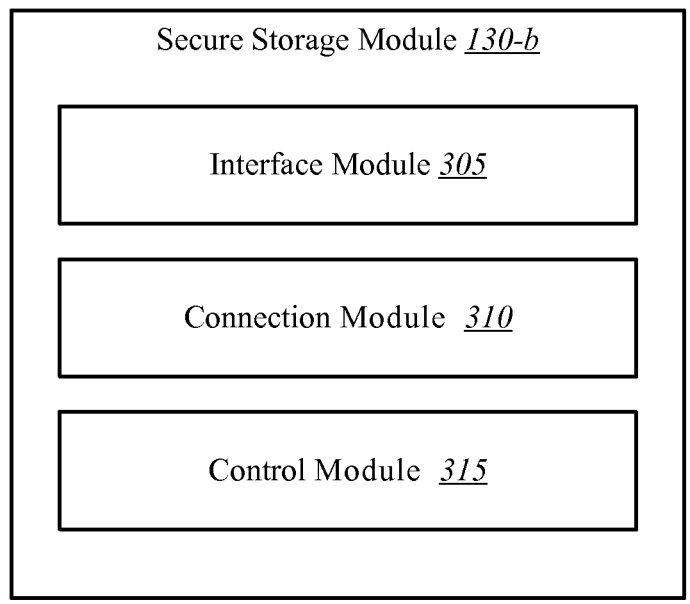
FIG. 3 shows a block diagram of a device in accordance with various aspects of this disclosure.

FIG. 3 shows a block diagram 300 of a secure storage module 130-b. The secure storage module 130-b may include one or more processors, memory, and/or one or more storage devices. The secure storage module 130-b may include interface module 305, connection module 310, and control module 315. The secure storage module 130-*b* may be one example of secure storage module 130 of FIGS. 1 and/or 2. Each of these components may be in communication with each other.

In one embodiment, the interface module 305 may discover one or more remote storage devices and/or remote computing devices. In some embodiments, interface module 305 may employ one or more communication protocols such as transmission control protocol/internet protocol (TCP/IP) protocols. In some cases, the interface module 305 may include a TCP/IP stack, an Ethernet chipset, and the like. In some embodiments, the interface module 305 may include one or more processors, storage controllers, memory, software, firmware, etc., on a storage device.

In one embodiment, the connection module 310 may establish a secure connection between a storage device and a remote storage device and/or remote client device. In some embodiments, the secure connection may include an encrypted data connection, secure socket layer (SSL) tunnel, a secure shell (SSH) tunnel, a virtual private network (VPN) tunnel, IP Security (IPSec) tunnel, point-to-point tunneling, IPSec VPN, SSL VPN, cryptographic IP encapsulation, etc. In some embodiments, the connection module 310 may include a VPN client.

In some cases, the secure connection may include a direct point-to-point connection between a storage device and the remote storage device. In some embodiments, the storage device and/or remote storage device may include at least one of a storage server, a storage enclosure containing a plurality of storage drives, and a just a bunch of drives (JBOD) storage device. In some cases the remote storage device may include a storage drive configured for incorporation into a data center or private cloud environment.

In some embodiments, the interface module 305 may advertise or broadcast a presence of the storage device to at least one of a second remote storage device and a remote computing device. In some cases, interface module 305 may receive a connection request from a remote device such as a remote computing device (e.g., a desktop, server, etc.) and/or a remote storage device (e.g., a storage server, a storage enclosure, etc.). In one embodiment, interface module 305 may request credentials from the remote device in response to the connection request. Likewise, in some cases, the remote device may request credentials from the storage device. In some embodiments, the storage device and remote devices may be pre-configured with credentials according to a predetermined communication protocol. In some cases, the storage devices and remote devices may be manufactured by the same company. Thus, the devices may be preconfigured by the company to find one another and establish secure connections between them.

In some embodiments, the interface module 305 may receive the requested credentials from the remote device and provide the requested credentials to the control module 315. In some embodiments, the control module 315 may perform an authentication of the remote device. In some cases, the authentication may be based at least in part on the credentials provided by the remote device. Upon determining the control module 315 has authenticated the remote computing device, the connection module 310 may establish a secure connection with the remote computing device. In some embodiments, the secure connection between the storage device and the remote device may include a VPN connection. In some cases, the secure connection may include a point-to-point connection between the storage device and the remote device.

Figure 4:
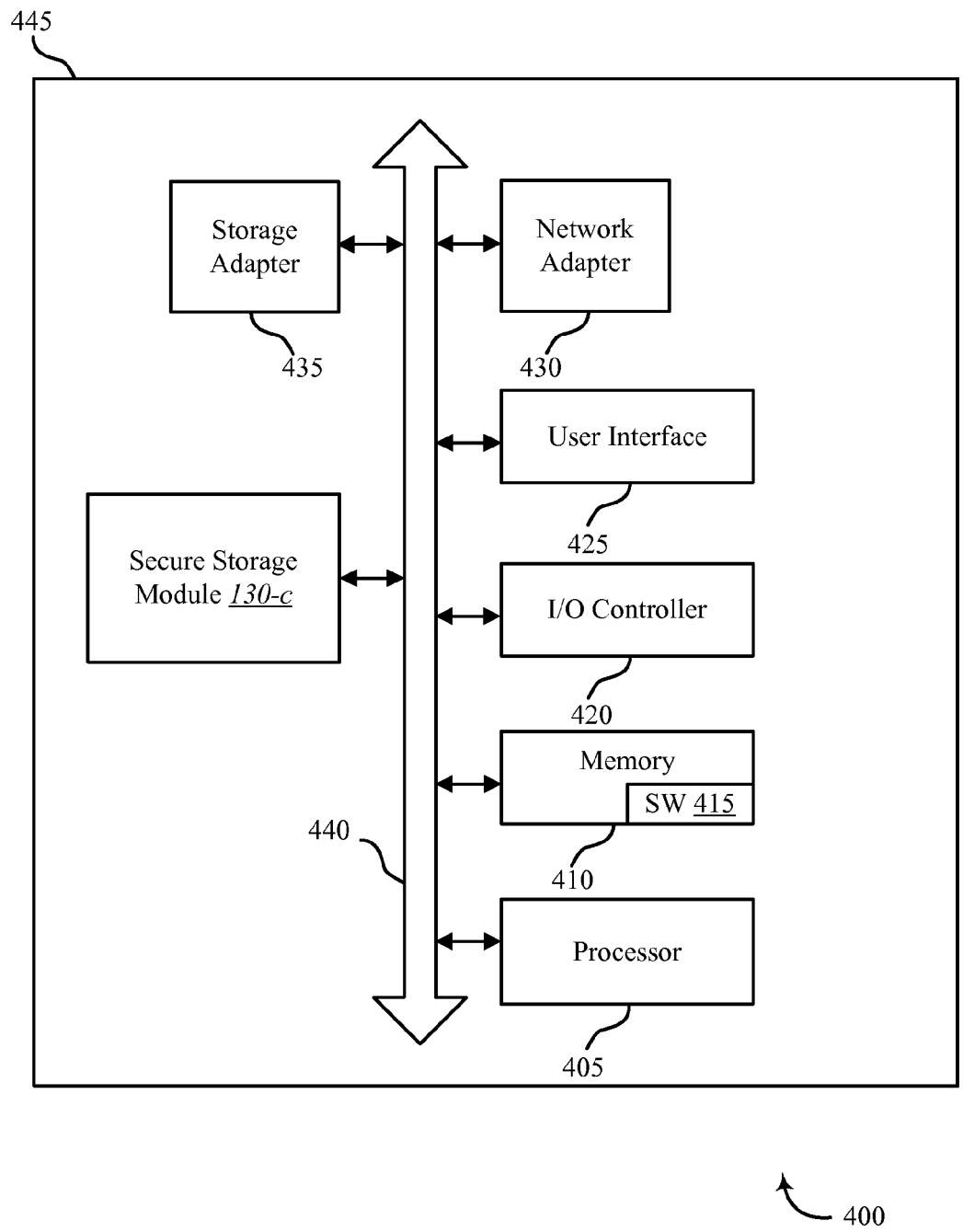
FIG. 4 shows a diagram of a system in accordance with various aspects of this disclosure.

FIG. 4 shows a system 400 for independently secured storage, in accordance with various examples. System 400 may include an apparatus 445, which may be an example of any one of device 105 of FIG. 1 and/or apparatus 205 of FIG. 2.

Apparatus 445 may include components for bi-directional voice and data communications including components for transmitting communications and components for receiving communications. For example, apparatus 445 may communicate bi-directionally with one or more storage devices and/or client systems. This bi-directional communication may be direct (e.g., apparatus 445 communicating directly with a storage system) and/or indirect (e.g., apparatus 445 communicating indirectly with a client device through a server).

Apparatus 445 may also include a processor module 405, and memory 410 (including software/firmware code (SW) 415), an input/output controller module 420, a user interface module 425, a network adapter 430, and a storage adapter 435. The software/firmware code 415 may be one example of a software application executing on apparatus 445. The network adapter 430 may communicate bi-directionally—via one or more wired links and/or wireless links—with one or more networks and/or client devices. In some embodiments, network adapter 430 may provide a direct connection to a client device via a direct network link to the Internet via a POP (point of presence). In some embodiments, network adapter 430 of apparatus 445 may provide a connection using wireless techniques, including digital cellular telephone connection, Cellular Digital Packet Data (CDPD) connection, digital satellite data connection, and/or another connection. The apparatus 445 may include a secure storage module 130-*c*, which may perform the functions described above for the secure storage module 130 of FIGS. 1, 2, and/or 3.

The signals associated with system 400 may include wireless communication signals such as radio frequency, electromagnetics, local area network (LAN), wide area network (WAN), virtual private network (VPN), wireless network (using 802.11, for example), cellular network (using 3G and/or LTE, for example), and/or other signals. The network adapter 430 may enable one or more of WWAN (GSM, CDMA, and WCDMA), WLAN (including BLUETOOTH® and Wi-Fi), WMAN (WiMAX) for mobile communications, antennas for Wireless Personal Area Network (WPAN) applications (including RFID and UWB), etc.

One or more buses 440 may allow data communication between one or more elements of apparatus 445 (e.g., processor module 405, memory 410, I/O controller module 420, user interface module 425, network adapter 430, and storage adapter 435, etc.).

The memory 410 may include random access memory (RAM), read only memory (ROM), flash RAM, and/or other types. The memory 410 may store computer-readable, computer-executable software/firmware code 415 including instructions that, when executed, cause the processor module 405 to perform various functions described in this disclosure. Alternatively, the software/firmware code 415 may not be directly executable by the processor module 405 but may cause a computer (e.g., when compiled and executed) to perform functions described herein. Alternatively, the computer-readable, computer-executable software/firmware code 415 may not be directly executable by the processor module 405, but may be configured to cause a computer (e.g., when compiled and executed) to perform functions described herein. The processor module 405 may include an intelligent hardware device, e.g., a central processing unit (CPU), a microcontroller, an application-specific integrated circuit (ASIC), etc.

In some embodiments, the memory 410 may contain, among other things, the Basic Input-Output system (BIOS) which may control basic hardware and/or software operation such as the interaction with peripheral components or devices. For example, at least a portion of the secure storage module 130-b to implement the present systems and methods may be stored within the system memory 410. Applications resident with system 400 are generally stored on and accessed via a non-transitory computer readable medium, such as a hard disk drive or other storage medium. Additionally, applications can be in the form of electronic signals modulated in accordance with the application and data communication technology when accessed via a network interface (e.g., network adapter 430, etc.).

Many other devices and/or subsystems may be connected to one or may be included as one or more elements of system 400 (e.g., personal computing device, mobile computing device, smart phone, server, internet-connected device, cell radio module, and so on). In some embodiments, all of the elements shown in FIG. 4 need not be present to practice the present systems and methods. The devices and subsystems can be interconnected in different ways from that shown in FIG. 4. In some embodiments, an aspect of some operation of a system, such as that shown in FIG. 4, may be readily known in the art and is not discussed in detail in this application. Code to implement the present disclosure can be stored in a non-transitory computer-readable medium such as one or more of system memory 410 or other memory. The operating system provided on I/O controller module 420 may be a mobile device operation system, a desktop/laptop operating system, or another known operating system.

The I/O controller module 420 may operate in conjunction with network adapter 430 and/or storage adapter 435. The network adapter 430 may enable apparatus 445 with the ability to communicate with client devices (e.g., device 105 of FIG. 1), and/or other devices over the network 110 of FIG. 1. Network adapter 430 may provide wired and/or wireless network connections. In some cases, network adapter 430 may include an Ethernet adapter or Fibre Channel adapter. In some embodiments, network adapter 430 may operate using one or more TCP/IP communication protocols. Storage adapter 435 may enable apparatus 445 to access one or more data storage devices (e.g., device 105). The one or more data storage devices may include two or more data tiers each. The storage adapter may include one or more of an Ethernet adapter, a Fibre Channel adapter, Fibre Channel Protocol (FCP) adapter, a SCSI adapter, and iSCSI protocol adapter.

Figure 5:
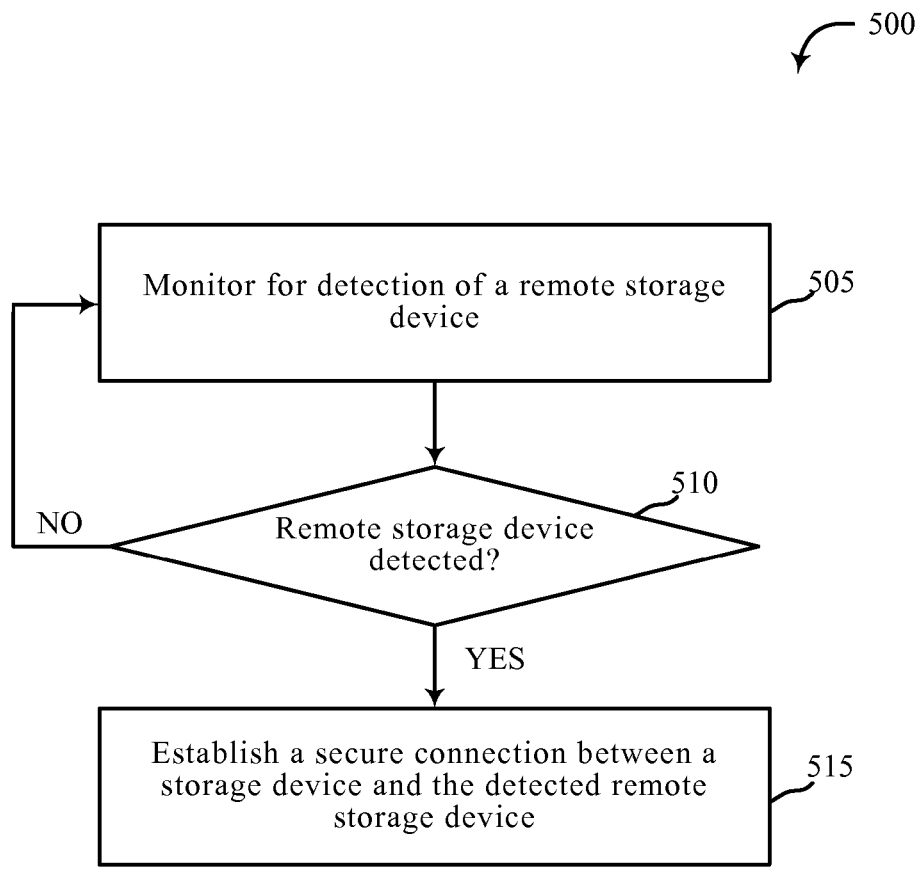
FIG. 5 is a flow chart illustrating an example of a method in accordance with various aspects of this disclosure.

FIG. 5 is a flow chart illustrating an example of a method 500 for real-time storage drive monitoring, in accordance with various aspects of the present disclosure. One or more aspects of the method 500 may be implemented in conjunction with device 105 of FIG. 1, apparatus 205 of FIG. 2, apparatus 445 of FIG. 4, and/or secure storage module 130 depicted in FIGS. 1, 2, 3, and/or 4. In some examples, a backend server, computing device, and/or storage device may execute one or more sets of codes to control the functional elements of the backend server, computing device, and/or storage device to perform one or more of the functions described below. Additionally or alternatively, the backend server, computing device, and/or storage device may perform one or more of the functions described below using special-purpose hardware.

At block 505, the method 500 may include monitoring for detection of a remote storage device. At block 510, the method 500 may include determining whether a remote storage device is detected. When a remote storage device is not detected, the method 500 may include continuing to monitor at block 505. On the other hand, when a remote storage device is detected, at block 515 the method 500 may include establishing a secure connection between a storage device and the detected remote storage device. In some cases, the secure connection may include a point-to-point connection between the storage device and the remote storage device.

The operation(s) at block 505-515 may be performed using the secure storage module 130 described with reference to FIGS. 1-4 and/or another module. Thus, the method 500 may provide for real-time storage drive monitoring relating to real-time storage drive monitoring. It should be noted that the method 500 is just one implementation and that the operations of the method 500 may be rearranged, omitted, and/or otherwise modified such that other implementations are possible and contemplated.

Figure 6:
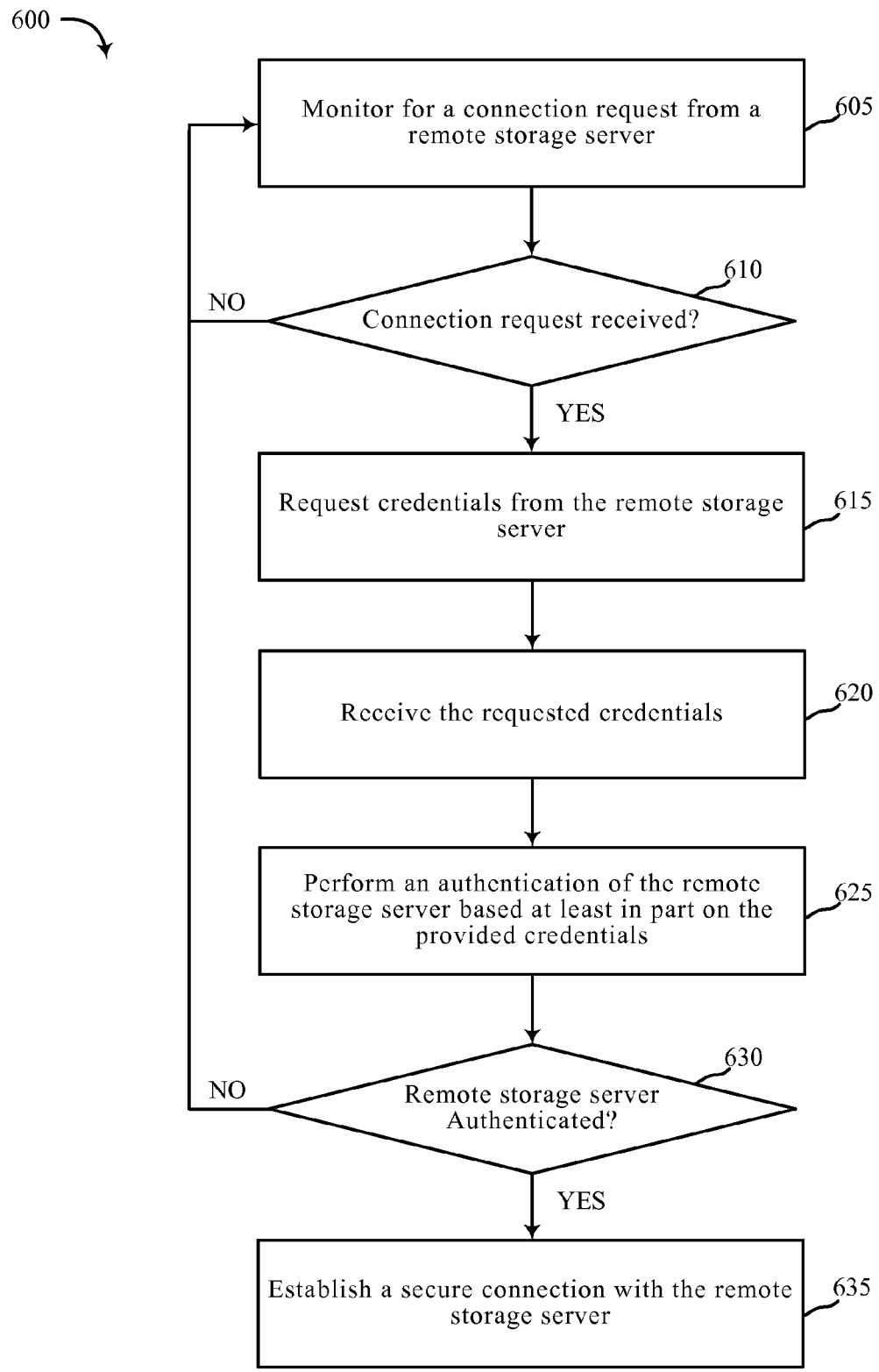
FIG. 6 is a flow chart illustrating an example of a method in accordance with various aspects of this disclosure.

FIG. 6 is a flow chart illustrating an example of a method 600 for real-time storage drive monitoring, in accordance with various aspects of the present disclosure. One or more aspects of the method 600 may be implemented in conjunction with device 105 of FIG. 1, apparatus 205 of FIG. 2, apparatus 445 of FIG. 4, and/or secure storage module 130 depicted in FIGS. 1, 2, 3, and/or 4. In some examples, a backend server, computing device, and/or storage device may execute one or more sets of codes to control the functional elements of the backend server, computing device, and/or storage device to perform one or more of the functions described below. Additionally or alternatively, the backend server, computing device, and/or storage device may perform one or more of the functions described below using special-purpose hardware.

At block 605, the method 600 may include monitoring for a connection request from a remote storage server. In some embodiments, the connection request may be received by a local storage server in response to the local storage server advertising its presence to the remote storage server. In some cases, a local storage server may monitor for an incoming connection request and process the request according to method 600. Additionally, or alternatively, in some embodiments, the local storage server may send a connection request to a remote storage server upon detecting the remote storage server. For example, the local storage server may perform a scan to detect one or more remote devices such as a remote storage server.

At block 610, the method 600 may include determining whether a connection request from a remote device is received. When a connection request is not received, the method 600 may continue to monitor for connection requests at block 605. On the other hand, when a connection request from a remote device such as a remote storage server is received, at block 615 the method 600 may include requesting credentials from the remote storage server. At block 620, the method 600 may include receiving the requested credentials. At block 625, the method 600 may include performing an authentication of the remote storage server based at least in part on the provided credentials. At block 630, the method 600 may include determining whether the remote storage server is authenticated. When the remote server fails authentication, the method 600 may continue to monitor for connection requests at block 605. On the other hand, when the remote server is authenticated, at block 635 the method 600 may include establishing a secure connection with the remote storage server. In some cases, the secure connection with the remote storage server may be a point-to-point connection between a local storage server and the remote storage server.

The operations at blocks 605-625 may be performed using the secure storage module 130 described with reference to FIGS. 1-4 and/or another module. Thus, the method 600 may provide for real-time storage drive monitoring relating to real-time storage drive monitoring. It should be noted that the method 600 is just one implementation and that the operations of the method 600 may be rearranged, omitted, and/or otherwise modified such that other implementations are possible and contemplated.

In some examples, aspects from two or more of the methods 500 and 600 may be combined and/or separated. It should be noted that the methods 500 and 600 are just example implementations, and that the operations of the methods 500 and 600 may be rearranged or otherwise modified such that other implementations are possible.

The detailed description set forth above in connection with the appended drawings describes examples and does not represent the only instances that may be implemented or that are within the scope of the claims. The terms "example" and "exemplary," when used in this description, mean "serving as an example, instance, or illustration," and not "preferred" or "advantageous over other examples." The detailed description includes specific details for the purpose of providing an understanding of the described techniques. These techniques, however, may be practiced without these specific details. In some instances, known structures and apparatuses are shown in block diagram form in order to avoid obscuring the concepts of the described examples.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and components described in connection with this disclosure may be implemented or performed with a general-purpose processor, a digital signal processor (DSP), an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, and/or state machine. A processor may also be implemented as a combination of computing devices, e.g., a combination of a DSP and a microprocessor, multiple microprocessors, one or more microprocessors in conjunction with a DSP core, and/or any other such configuration.

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope and spirit of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations.

As used herein, including in the claims, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination. Also, as used herein, including in the claims, "or" as used in a list of items (for example, a list of items prefaced by a phrase such as "at least one of" or "one or more of") indicates a disjunctive list such that, for example, a list of "at least one of A, B, or C" means A or B or C or AB or AC or BC or ABC (i.e., A and B and C).

In addition, any disclosure of components contained within other components or separate from other components should be considered exemplary because multiple other architectures may potentially be implemented to achieve the same functionality, including incorporating all, most, and/or some elements as part of one or more unitary structures and/or separate structures.

Computer-readable media includes both computer storage media and communication media including any medium that facilitates transfer of a computer program from one place to another. A storage medium may be any available medium that can be accessed by a general purpose or special purpose computer. By way of example, and not limitation, computer-readable media can comprise RAM, ROM, EEPROM, flash memory, CD-ROM, DVD, or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The previous description of the disclosure is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not to be limited to the examples and designs described herein but is to be accorded the broadest scope consistent with the principles and novel features disclosed.

This disclosure may specifically apply to security system applications. This disclosure may specifically apply to storage system applications. In some embodiments, the concepts, the technical descriptions, the features, the methods, the ideas, and/or the descriptions may specifically apply to storage and/or data security system applications. Distinct advantages of such systems for these specific applications are apparent from this disclosure.

The process parameters, actions, and steps described and/or illustrated in this disclosure are given by way of example only and can be varied as desired. For example, while the steps illustrated and/or described may be shown or discussed in a particular order, these steps do not necessarily need to be performed in the order illustrated or discussed. The various exemplary methods described and/or illustrated here may also omit one or more of the steps described or illustrated here or include additional steps in addition to those disclosed.

Furthermore, while various embodiments have been described and/or illustrated here in the context of fully functional computing systems, one or more of these exemplary embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may permit and/or instruct a computing system to perform one or more of the exemplary embodiments disclosed here.

This description, for purposes of explanation, has been described with reference to specific embodiments. The illustrative discussions above, however, are not intended to be exhaustive or limit the present systems and methods to the precise forms discussed. Many modifications and variations are possible in view of the above teachings. The embodiments were chosen and described in order to explain the principles of the present systems and methods and their practical applications, to enable others skilled in the art to utilize the present systems, apparatus, and methods and various embodiments with various modifications as may be suited to the particular use contemplated.

What is claimed is:

1. A storage drive comprising:
    a network adapter processor of a network adapter to identify a first remote device, the first remote device comprising a first storage device or a first computing device; and
    a storage drive processor of the storage drive to instruct a virtual private network (VPN) client to establish a first connection between the storage drive and the first remote device, the first connection including a point-to-point connection between the storage drive and the first remote device, wherein the network adapter and the VPN client are enclosed within the storage drive, and wherein the storage drive is included in a local device, the local device establishing a second connection to a client device, the first connection being independent from the second connection.

2. The storage drive of claim 1, comprising:
    the network adapter to advertise a presence of the storage drive to a second remote device, the second remote device comprising a second storage device or a second remote computing device.

3. The storage drive of claim 1, comprising:
    the network adapter to receive a connection request from a third remote device, the third remote device comprising a third storage device or a third remote computing device.

4. The storage drive of claim 3, comprising:
    the network adapter to request credentials from the remote computing device in response to the connection request.

5. The storage drive of claim 4, comprising:
    the network adapter to receive the requested credentials; and
    a processor of the storage drive to perform an authentication of the third remote device based at least in part on the provided credentials.

6. The storage drive of claim 5, comprising:
    upon authenticating the third remote device, the VPN client to establish a secure connection with the remote computing device.

7. The storage drive of claim 6, wherein the secure connection between the storage device and the third remote device includes a VPN connection.

8. The storage drive of claim 6, wherein the secure connection with the third remote device is a point-to-point connection between the storage drive and the third remote device.

9. The storage drive of claim 1, wherein the local device includes at least one of a storage server, a storage enclosure containing a plurality of storage drives, and a just a bunch of drives (JBOD) storage device, or any combination thereof.

10. The storage drive of claim 1, wherein the network adapter includes a transmission control protocol/internet protocol (TCP/IP) stack.

11. An apparatus comprising:
    a plurality of storage drives configured for incorporation into a data center or cloud environment;
    a network adapter in at least one of the plurality of storage drives to identify a first remote device, the first remote device comprising a first storage device or a first computing device; and
    a storage drive from the plurality of storage drives to instruct a virtual private network (VPN) client to establish a first connection between the apparatus and the first remote device, the first connection including a point-to-point connection between the apparatus and the first remote device, wherein the network adapter and the VPN client are enclosed within the storage drive from the plurality of storage drives, and wherein the storage drive is included in the apparatus, the apparatus establishing a second connection to a client device, the first connection being independent from the second connection.

12. The apparatus of claim 11, comprising:
    the network adapter to advertise a presence of the apparatus to second remote device, the second remote device comprising a second storage device or a second remote computing device.

13. The apparatus of claim 11, comprising:
    the network adapter to receive a connection request from a third remote device, the third remote device comprising a third storage device or a third remote computing device.

14. The apparatus of claim 13, comprising:
    the network adapter to request credentials from the remote computing device in response to the connection request.

15. The apparatus of claim 14, comprising:
    the network adapter to receive the requested credentials; and
    a processor of the apparatus to perform an authentication of the third remote device based at least in part on the provided credentials.

16. The apparatus of claim 15, comprising:
    upon authenticating the third remote device, the VPN client to establish a secure connection with the remote computing device, wherein the secure connection with the third remote device is a point-to-point connection between the storage drive and the third remote device.

17. A method comprising:
identifying, by a processor of a storage device, a first remote device, the first remote device comprising a first storage device or a first computing device; and
establishing, by the processor, a first connection between the storage device and the first remote device, the first connection including a point-to-point connection between the storage device and the first remote device, the storage device including a storage drive, wherein the network adapter and the VPN client are enclosed within the storage device, and wherein the storage drive is included in a local device, the local device establishing a second connection to a client device, the first connection being independent from the second connection.

18. The method of claim 17, comprising:
advertising a presence of the storage device to a second remote device, the second remote device comprising a second storage device or a second remote computing device.

19. The method of claim 17, comprising:
receiving a connection request from a third remote device, the third remote device comprising a third storage device or a third remote computing device; and
requesting credentials from the third remote device in response to the connection request.

20. The method of claim 19, comprising:
receiving the requested credentials;
performing an authentication of the third remote device based at least in part on the provided credentials; and
upon authenticating the third remote device, establishing a secure connection with the third remote device, wherein the secure connection with the third remote device is a point-to-point connection between the storage device and the third remote device.

* * * * *